United States Patent
Kim et al.

(10) Patent No.: US 10,686,209 B2
(45) Date of Patent: Jun. 16, 2020

(54) ELECTRODE ASSEMBLY, BATTERY CELL INCLUDING THE ELECTRODE ASSEMBLY, AND METHOD OF PREPARING THE BATTERY CELL

(71) Applicant: SAMSUNG SDI CO., LTD., Yongin-si, Gyeonggi-do (KR)

(72) Inventors: Cheon-Soo Kim, Yongin-si (KR); Ho-Seong Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 95 days.

(21) Appl. No.: 13/963,976

(22) Filed: Aug. 9, 2013

(65) Prior Publication Data
US 2014/0234679 A1    Aug. 21, 2014

(30) Foreign Application Priority Data
Feb. 21, 2013    (KR) .................. 10-2013-0018829

(51) Int. Cl.
*H01M 10/04*    (2006.01)
*H01M 2/16*    (2006.01)
(Continued)

(52) U.S. Cl.
CPC ..... *H01M 10/0431* (2013.01); *H01M 2/1653* (2013.01); *H01M 2/1686* (2013.01);
(Continued)

(58) Field of Classification Search
None
See application file for complete search history.

(56) References Cited

U.S. PATENT DOCUMENTS 5,958,088 A * 9/1999 Vu .................. H01M 2/021
                                          29/623.1
6,328,770 B1 * 12/2001 Gozdz ............. H01M 2/1653
                                          29/623.3

(Continued)

FOREIGN PATENT DOCUMENTS

CN          1547782 A    11/2004
JP       2007-311337 A    11/2007

(Continued)

OTHER PUBLICATIONS

EPO Search Report dated Apr. 7, 2014, for corresponding European Patent application 13180131.8, (8 pages).

(Continued)

*Primary Examiner* — Barbara L Gilliam
*Assistant Examiner* — Angela J Martin
(74) *Attorney, Agent, or Firm* — Lewis Roca Rothgerber Christie LLP (57) ABSTRACT

An electrode assembly is prepared by stacking and winding a first electrode, a second electrode, and a separator disposed between the first and second electrodes. The electrode assembly is curved to the center of an axis that is substantially parallel to a length direction of the electrode assembly, and the separator has a coated layer of a thermoplastic polymer on at least one side thereof. A battery cell including the electrode assembly, and a method of preparing the battery cell have also been disclosed. The battery cell including the electrode assembly may have a high strength.

9 Claims, 8 Drawing Sheets

(51) Int. Cl.
  *H01M 6/40* (2006.01)
  *H01M 10/05* (2010.01)
  *H01M 10/0587* (2010.01)
  *H01M 10/0525* (2010.01)
(52) U.S. Cl.
  CPC ......... *H01M 6/40* (2013.01); *H01M 10/0436* (2013.01); *H01M 10/0525* (2013.01); *H01M 10/0587* (2013.01); *H01M 2/1673* (2013.01); *Y02T 10/7011* (2013.01); *Y10T 29/4911* (2015.01)

(56) References Cited

U.S. PATENT DOCUMENTS

| | | | | |
|---|---|---|---|---|
| 7,103,415 | B2* | 9/2006 | Probst | A61N 1/375 607/36 |
| 2003/0039883 | A1 | 2/2003 | Notten et al. | |
| 2003/0108787 | A1* | 6/2003 | Endo | H01B 1/122 429/94 |
| 2008/0006450 | A1 | 1/2008 | Simons | |
| 2011/0097615 | A1* | 4/2011 | Goh | H01M 2/0275 429/94 |
| 2012/0183825 | A1* | 7/2012 | Lee | H01M 10/0431 429/94 |
| 2013/0136967 | A1* | 5/2013 | Bhardwaj | H01M 10/0431 429/94 |

FOREIGN PATENT DOCUMENTS

| | | |
|---|---|---|
| JP | 2009-231244 A | 10/2009 |
| JP | 2010-192200 A | 9/2010 |
| JP | 2012-221741 A | 11/2012 |
| KR | 10-2009-0097731 A | 9/2009 |
| KR | 10-2010-0082677 A | 7/2010 |
| WO | WO 01/82393 * | 11/2001 |
| WO | WO 01/82393 A2 | 11/2001 |
| WO | WO 2013/062662 A1 | 5/2013 |

OTHER PUBLICATIONS

Patent Abstracts of Japan and English Machine Translation of JP 2009-231244 A listed above, 17 pages.
SIPO Office Action, with English translation, dated Feb. 24, 2017, for corresponding Chinese Patent Application No. 201310560557.6 (20 pages).
EPO Office Action dated Oct. 30, 2017, for corresponding European Patent Application No. 13180131.8 (5 pages).
SIPO Office Action, with English translation, dated Nov. 1, 2017, for corresponding Chinese Patent Application No. 201310560557.6 (22 pages).
Chinese Office Action, with English translation, dated Sep. 30, 2018, for corresponding Chinese Patent Application No. 201310560557.6 (6 pages).
Japanese Office action for corresponding Japanese Patent Application No. 2013-171183, dated Apr. 9, 2019, 28 pages.
Korean Patent Office Action for corresponding Korean Patent Application No. 10-2013-0111188, dated Sep. 10, 2019, 6 pages.
Chinese Office Action, with English translation, dated May 9, 2018, for corresponding Chinese Patent Application No. 201310560557.6 (20 pages).

* cited by examiner

ELECTRODE ASSEMBLY, BATTERY CELL INCLUDING THE ELECTRODE ASSEMBLY, AND METHOD OF PREPARING THE BATTERY CELL

CROSS-REFERENCE TO RELATED APPLICATION

This application claims priority to and the benefit of Korean Patent Application No. 10-2013-0018829, filed on Feb. 21, 2013, in the Korean Intellectual Property Office, the disclosure of which is incorporated herein in its entirety by reference.

BACKGROUND

1. Field

The following description relates to an electrode assembly, a battery cell including the electrode assembly, and a method of preparing the battery cell.

2. Description of the Related Art

Demands for secondary batteries in portable electronic devices for information communication, for example, personal digital assistants (PDAs), mobile phones, and laptop computers, electric bicycles, electric vehicles, etc. are being greatly increased. As electronic devices are getting smaller and lighter, rechargeable lithium batteries that are small, light, and have high-capacity are selected for practical use.

The lithium batteries can have a thin rectangular shape or a thin pouch shape and thus are easily applicable to electronic devices such as mobile phones. However, since the rectangular-shaped or pouch-shaped lithium batteries may not use an inner space efficiently due to a flat surface geometry and may not be able to be applied to electronic devices with various shapes or various sizes.

Accordingly, in order to be used in electronic devices such as mobile phones having a streamlined-shape, there is a demand that a battery cell having a shape that allows efficient use of an inner space and thus achieves a high capacity.

Also, in order to prepare the battery cell as above, the adhesion between a separator and an electrode plate is required to be improved to achieve a high strength.

SUMMARY

One or more aspects of embodiments of the present invention are directed toward an electrode assembly having an improved adhesion between a separator and an electrode plate.

One or more aspects of embodiments of the present invention are directed toward a battery cell including the electrode assembly.

One or more aspects of embodiments of the present invention are directed toward a method of preparing the battery cell.

One or more aspects of embodiments of the present invention are directed toward an electrode assembly having a curved-shape to allow efficient use of an inner space and having an improved adhesion between a separator and an electrode plate, a battery cell including the electrode assembly, and a method of preparing the battery cell.

Additional aspects will be set forth in part in the description which follows and, in part, will be apparent from the description, or may be learned by practice of the presented embodiments.

According to one or more embodiments of the present invention, an electrode assembly is prepared by stacking and winding a first electrode, a second electrode, and a separator interposed between the first and second electrodes, wherein the electrode assembly is curved to the center of an axis that is substantially parallel to an edge of the electrode assembly in a length direction, and wherein the separator has a coated layer of a thermoplastic polymer on at least one side thereof.

According to one or more embodiments of the present invention, a battery cell includes an electrode assembly prepared by stacking and winding a first electrode, a second electrode, and a separator between the first and second electrodes and having at least one coated layer comprising a thermoplastic polymer; a pair of electrode tabs protruding from one side surface of the electrode assembly; and a case accommodating the electrode assembly and an electrolyte and curved to the center of a same axis as an axis of the electrode assembly that is substantially parallel to an edge of the electrode assembly in a length direction.

According to one or more embodiments of the present invention, a method of preparing a battery cell includes preparing a separator comprising coated layers of a thermoplastic polymer on both sides of the separator; preparing an electrode assembly comprising a first electrode, a second electrode, and the separator between the first and second electrodes; preparing a flat battery cell by accommodating the electrode assembly in a case, sealing the case except for an electrolyte inlet, and sealing the electrolyte inlet after injecting an electrolyte; and curving the flat battery cell to the center of an axis that is substantially parallel to an edge of the electrode assembly in a length direction.

The curving of the flat battery cell may include mounting and pressing the flat battery cell on a jig; and separating and removing the battery cell from the jig.

An error range between an average radius of curvature R of the battery cell and a radius of curvature r of the jig may be equal to or less than about 20 mm.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in more detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. The terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. The term "and/or" includes any and all combinations of one or more of the associated listed items.

According to one or more embodiments of the present invention, an electrode assembly is prepared by stacking and winding a first electrode, a second electrode, and a separator disposed between the first and second electrodes, wherein the electrode assembly is curved to the center of an axis that is substantially parallel to an edge of the electrode assembly in a length direction, and wherein the separator has a coated layer of a thermoplastic polymer on at least one side thereof.

Figure 1:
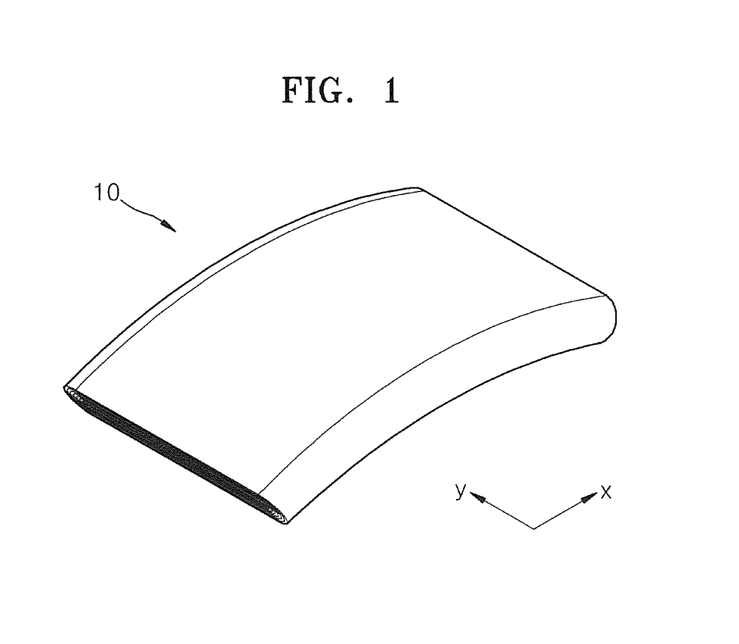
FIG. 1 is a schematic perspective view of an electrode assembly according to an embodiment of the present invention.

FIG. 1 is a schematic perspective view of an electrode assembly 10 according to an embodiment of the present invention.

Referring to FIG. 1, the electrode assembly 10 has a curved-shape which curves to the center of an axis that is substantially parallel to a length direction of the electrode assembly 10. In this specification, a "length direction" refers to an x-axis direction in FIG. 1, and the electrode assembly 10 has a curved-shape that curves to the center of an axis that is substantially parallel to the x-axis direction.

Since the electrode assembly 10 is easily applied to an electronic device such as a mobile phone having a streamlined-shape, the efficiency of usage of an inner space may be improved and thus a capacity may be increased by such usage of the inner space.

Figure 2:
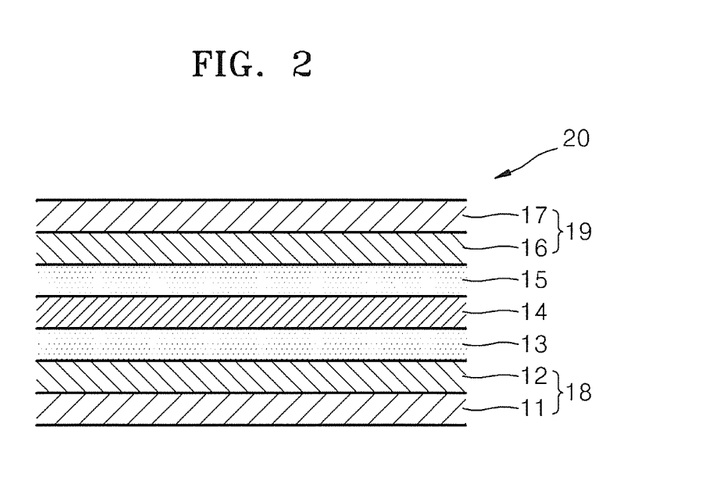
FIG. 2 is a schematic cross-sectional view showing a state before an electrode assembly is wound, according to an embodiment of the present invention.

FIG. 2 is a schematic cross-sectional view showing a state before an electrode assembly 20 is wound, according to an embodiment of the present invention.

Referring to FIG. 2, the electrode assembly 20 is prepared by stacking a first electrode 18 including a first electrode plate 11 and a first electrode active material layer 12, a second electrode 19 including a second electrode plate 17 and a second electrode active material layer 16, and a separator 14 interposed between the first and second electrodes 18 and 19.

The first electrode 18 including the first electrode plate 11 and the first electrode active material layer 12 corresponds to a positive electrode. The first electrode plate 11 may use aluminum, titanium, or an alloy thereof as a positive electrode current collector. The first electrode active material layer 12 may include a positive electrode active material as a first electrode active material, a binder, and optionally a conductive material, and may be formed by, for example, mixing the positive electrode active material, the binder, and optionally the conductive material with a solvent to a form of slurry, coating them on the first electrode plate 11, and then performing heat treatment.

The positive electrode active material may be a compound capable of allowing intercalation and deintercalation of lithium ions, for example, a lithium-containing transition metal oxide such as $LiCoO_2$, $LiNiO_2$, $LiMnO_2$, or $LiMn_2O_4$ or a lithium chalcogenide compound. The binder may be, for example, a vinylidene fluoride/hexafluoropropylene copolymer, polyvinylidenefluoride, or polyacrylonitrile. The conductive material may be, for example, a carbon material. The solvent may be, for example, N-methylpyrrolidone, acetone, or water.

The second electrode 19 including the second electrode plate 17 and the second electrode active material layer 16 corresponds to a negative electrode. The second electrode plate 17 may use copper or nickel as a negative electrode current collector. The second electrode active material layer 16 may include a negative electrode active material as a second electrode active material, a binder, and optionally a conductive material, and may be formed by, for example, mixing the negative electrode active material, the binder, and optionally the conductive material with a solvent to a form of slurry, coating them on the second electrode plate 17, and then performing heat treatment.

The negative electrode active material may be, for example, a carbon material such as crystalline carbon, amorphous carbon, a carbon composite, or carbon fiber, lithium metal, or a lithium alloy. The binder, the conductive material, and the solvent may be the same as those of the first electrode active material layer.

The separator 14 is coated with a layer of a thermoplastic polymer on at least one side. In one embodiment, both sides of the separator 14 are coated with a thermoplastic polymer layer 13 and 15 respectively.

The thermoplastic polymer may be a fluorine-based thermoplastic polymer. The thermoplastic polymer may include, for example, polyvinylidenefluoride or polyvinylidenefluoride-co-hexafluoropropylene.

The separator 14 coated with the fluorine-based thermoplastic polymer layers 13 and 15 on both sides of the separator 14 respectively may improve the adhesion between the separator 14 and the first electrode plate 11, and between the separator 14 and the second electrode plate 17 and thus may achieve a very high strength of a battery cell and a battery pack including a curve-shaped electrode assembly.

The separator 14 may be a porous polyolefin-based separator. The porous polyolefin-based separator may be formed of, for example, at least one polymer selected from the group consisting of polyethylene, polypropylene, polybutylene, and polypentene, or a mixture thereof.

The separator 14 may have a thickness of about 5 µm to about 30 µm, for example, about 7 µm to about 27 µm, or, for example, about 16 µm to about 27 µm. The coated layers 13 and 15 may have a thickness of about 0.5 μm to about 6 μm, for example, about 3 μm to about 6 μm.

In one embodiment, the separator 14 with the coated thermoplastic polymer layers 13 and 15 within the above thickness ranges has improved adhesion between the separator 14 and the first electrode plate 11, and between the separator 14 and the second electrode plate 17, and allows an electrolyte to easily permeate through the separator 14.

The electrode assembly 20 of FIG. 2 may be wound to a form of jelly-roll and thus, as illustrated in FIG. 1, the electrode assembly 10 having a curved-shape that curves to the center of an axis that is substantially parallel to an edge of the electrode assembly 10 in a length direction may be prepared.

The electrode assembly 10 is symmetrical with respect to an axis that passes through the center of the electrode assembly 10. That is, the electrode assembly 10 has the same radius of curvature at each end side of the electrode assembly 10 as the radius of curvature at the center of the electrode assembly 10.

The electrode assembly 10 may have a radius of curvature of about 150 to about 600 mm, for example, about 250 to about 600 mm. In one embodiment, the electrode assembly 10 within the above radius of curvature range can minimize or reduce damage of an electrode plate and may be constantly maintained in a curved-shape which curves to the center of an axis that is substantially parallel to an edge of the electrode assembly 10 in a length direction.

Figure 3A:
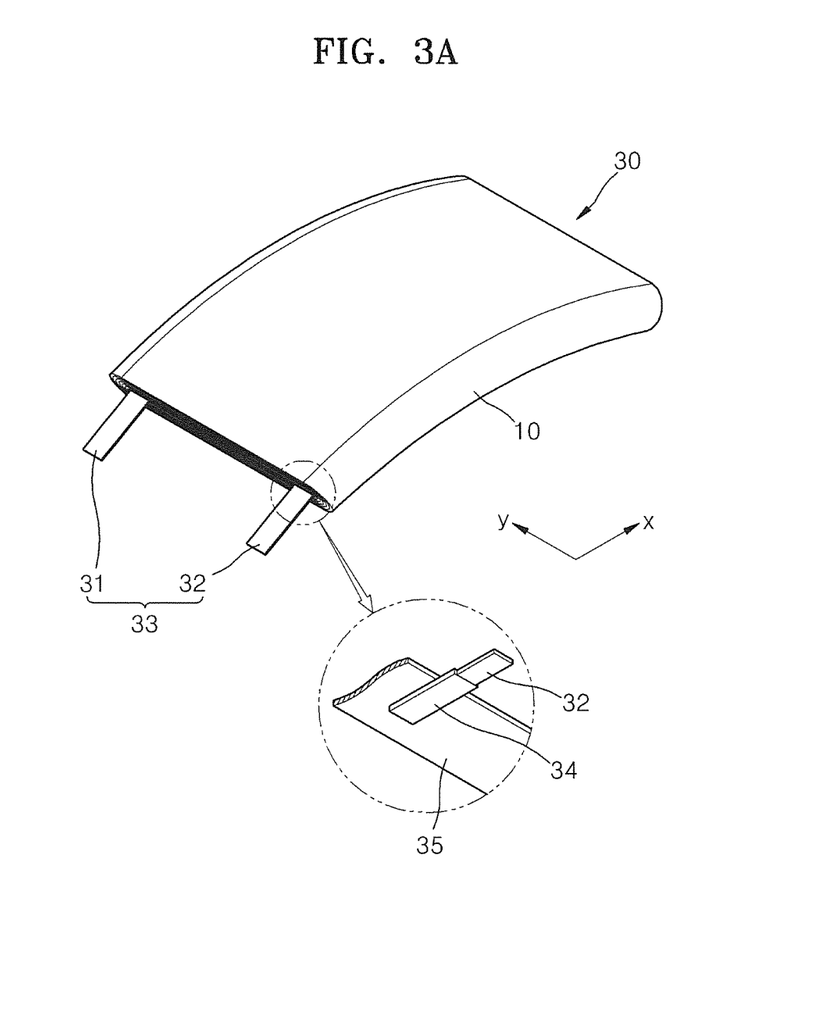
FIG. 3A is a schematic perspective view of a battery cell according to an embodiment of the present invention.

FIG. 3A is a schematic perspective view of a battery cell 30 according to an embodiment of the present invention.

Referring to FIG. 3, the battery cell 30 includes the electrode assembly 10 and a pair of electrode tabs 33 including a first and a second electrode tabs 31 and 32 protruding from a side of the electrode assembly 10. An electrolyte inlet may be disposed on the side where the pair of electrode tabs 33 are located. Insulating tape 34 for preventing a short circuit between the first and the second electrode plates 35 may be formed on each of the first and second electrode tabs 31 and 32. The insulating tape 34 is illustrated in a circle of a broken line in FIG. 3A.

Figure 3B:
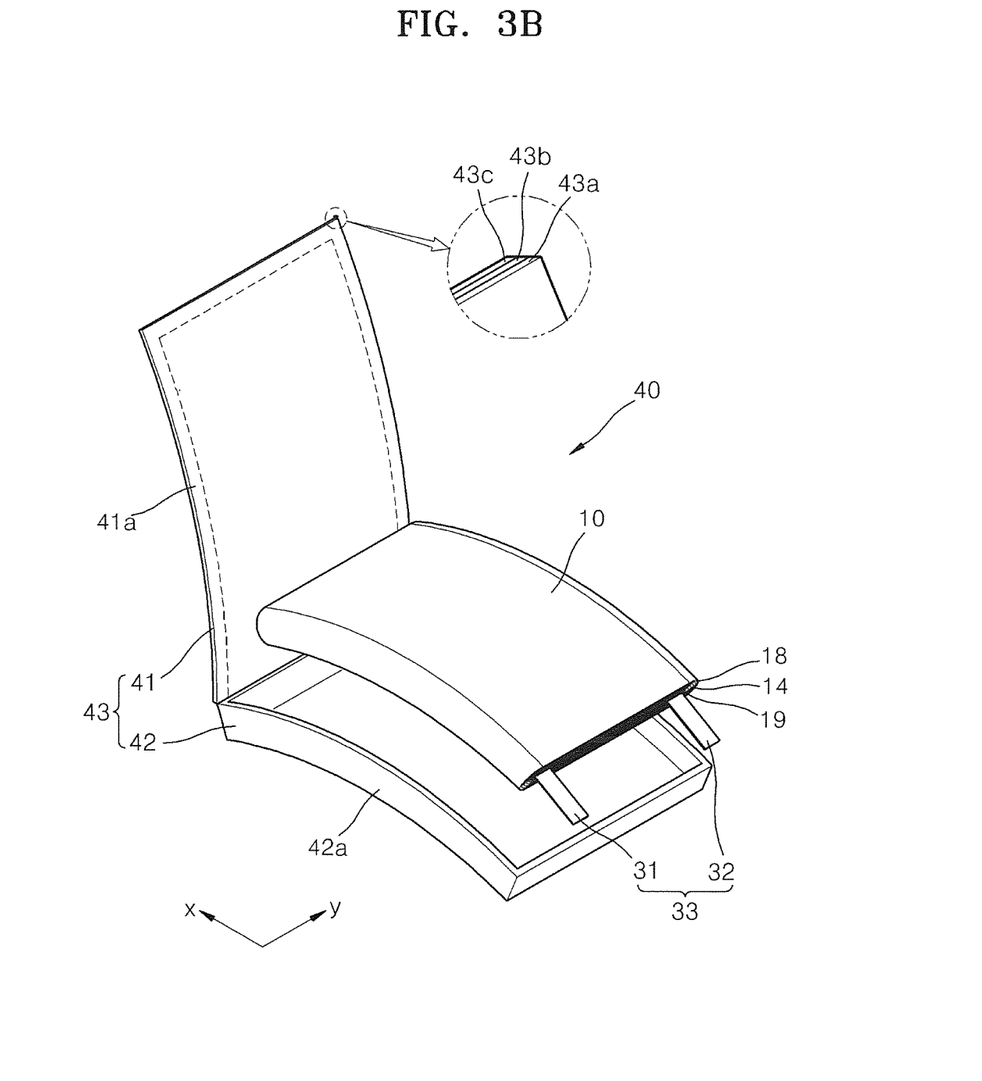
FIG. 3B is a schematic exploded perspective view of the battery cell illustrated in FIG. 3A.

FIG. 3B is a schematic exploded perspective view of the battery cell 30 illustrated in FIG. 3A.

Referring to FIG. 3B, the battery cell 40 includes an electrode assembly 10 prepared by stacking and winding a first electrode 18, a second electrode 19, and a separator 14 interposed between the first and second electrodes 18 and 19 and having at least one surface including a coated layer of a thermoplastic polymer, a pair of electrode tabs 33 including a first and a second electrode tabs 31 and 32 protruding from a side of the electrode assembly 10, and a case 43 accommodating the electrode assembly 10 and an electrolyte, and the battery cell 40 is curved to the center of the same axis as the electrode assembly 10.

The thermoplastic polymer may be a fluorine-based thermoplastic polymer. For example, the thermoplastic polymer may include polyvinylidenefluoride or polyvinylidenefluoride-co-hexafluoropropylene. Since the separator 14 is coated with either layer 13 or 15 of a thermoplastic polymer on at least one side, for example, both sides thereof, the adhesion between the separator 14 and the first electrode plate 11, and/or between the separator 14 and the second electrode plate 17 may be improved and thus the strength of the battery cell 40 may be greatly increased. A thickness of the coated layers 13 and 15 may be from about 0.5 μm to about 6 μm, for example, from about 3 μm to about 6 μm.

The separator 14 may be a porous polyolefin-based separator. The porous polyolefin-based separator may be formed of, for example, at least one polymer selected from the group consisting of polyethylene, polypropylene, polybutylene, and polypentene, or a mixture thereof. A thickness of the separator 14 may be from about 5 μm to about 30 μm, for example, from about 7 μm to about 27 μm, or, for example, from about 16 μm to about 27 μm.

The electrolyte may include lithium salt and a non-aqueous organic solvent.

The lithium salt may be a material capable of being dissolved in an organic solvent and functioning as a source of lithium ions in a battery so as to allow basic functions of a lithium battery and to promote mobility of lithium ions between a positive electrode and a negative electrode, and may include at least one selected from the group consisting of $LiPF_6$, $LiBF_4$, $LiClO_4$, $Li(CF_3SO_2)_2N$, $LiCF_3SO_3$, $LiSbF_6$, and $LiAsF_6$. A concentration of the lithium salt may be in a range of about 0.1 to about 2.0 M. In one embodiment, when the concentration of the lithium salt is included in the above range, since the electrolyte has appropriate conductivity and viscosity, the electrolyte has an excellent performance and the lithium ions move effectively.

The non-aqueous organic solvent may function as a medium in which ions involved in electrochemical reaction of a battery move, and may include a carbonate-based solvent, an ester-based solvent, an ether-based solvent, a ketone-based solvent, an alcohol-based solvent, or a non-protic solvent. The carbonate-based solvent may be, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), or butylene carbonate (BC), and the ester-based solvent may be, for example, methyl acetate, ethyl acetate, n-propyl acetate, t-butylacetate, methylpropionate, ethylpropionate, γ-butyrolactone, decanolide, valerolactone, mevalonolactone, or caprolactone. The ether-based solvent may be, for example, dibutyl ether, tetraglyme, diglyme, dimethoxyethane, 2-methyltetrahydrofuran, or tetrahydrofuran, and the ketone-based solvent may be, for example, cyclohexanone. Also, the alcohol-based solvent may be, for example, ethylalcohol or isopropyl alcohol, and the non-protic solvent may be, for example, a nitrile solvent such as R—CN (R is a linear, branched, or ring-structured hydrocarbon radical having a carbon number of 2 to 20, and may include a double-bond aromatic ring or an ether bond), an amide-based solvent such as dimethylformamide, a dioxolane-based solvent such as 1,3-dioxolane, or a sulfolane-based solvent.

The non-aqueous organic solvent may be used solely or may be mixed with at least one other non-aqueous organic solvent. If two or more non-aqueous organic solvents are mixed, a suitable mixing ratio may be appropriately adjusted depending on a desired battery performance.

The electrode assembly 10 has a curved-shape which curves to the center of an axis that is substantially parallel to an edge of the electrode assembly 10 in a length direction. The electrode assembly 10 is symmetrical with respect to an axis that passes through the center of the electrode assembly 10.

The electrode assembly 10 may have a radius of curvature of about 150 mm to about 600 mm, for example, about 250 mm to about 600 mm. The electrode assembly 10 may minimize or reduce damage of an electrode plate and may be constantly maintained in a curved-shape.

Still referring to FIG. 3B, the case 43 accommodates the electrode assembly 10, a complement material, and an electrolyte, and may include an upper case 41 and a lower case 42. The upper case 41 and the lower case 42 are integrally bonded to each other along their edges so as to seal the electrode assembly 10. An accommodation space for accommodating the electrode assembly 10 may be formed in the lower case 42 by using press working.

The case 43 may be prepared in a form of a soft pouch. For example, the case 43 may have a multilayer structure including a heat fusion layer 43a capable of being heat fused to function as a sealant, a metal layer 43b functioning as a barrier against moisture and oxygen while maintaining a mechanical strength, and an insulating layer 43c. The heat fusion layer 43a may be formed on an inner side of the metal layer 43b and the insulating layer 43c may be formed on an outer side of the metal layer 43b. Also, a complement material may be included between the case 43 and the electrode assembly 10. Since the pouch-shaped case 43 is soft, the overall strength of the battery cell 40 may be improved by inclusion of the complement material.

The case 43 has a curved-shape which curves to the center of the same axis of the electrode assembly 10. That is, the case 43 has a curved-shape which curves to the center of an axis that is substantially parallel to an edge of the electrode assembly 10 in a length direction.

Since the battery cell 40 has a curved-shape, it can be easily applied to an electronic device such as a mobile phone having a streamlined-shape, the efficiency of usage of an inner space may be improved and a capacity may be increased by such usage of the inner space.

According to one or more embodiments of the present invention, a battery pack includes an electrode assembly prepared by stacking and winding a first electrode, a second electrode, and a separator disposed between the first and second electrodes and having at least one side including a coated thermoplastic polymer layer; a pair of electrode tabs protruding from one side of the electrode assembly; a case accommodating and sealing the electrode assembly and an electrolyte and curved to the center of a same axis as an axis of the electrode assembly that is substantially parallel to an edge of the electrode assembly in a length direction; and a protection circuit module (PCM) electrically connected to the electrode assembly through the pair of electrode tabs.

Figure 4A:
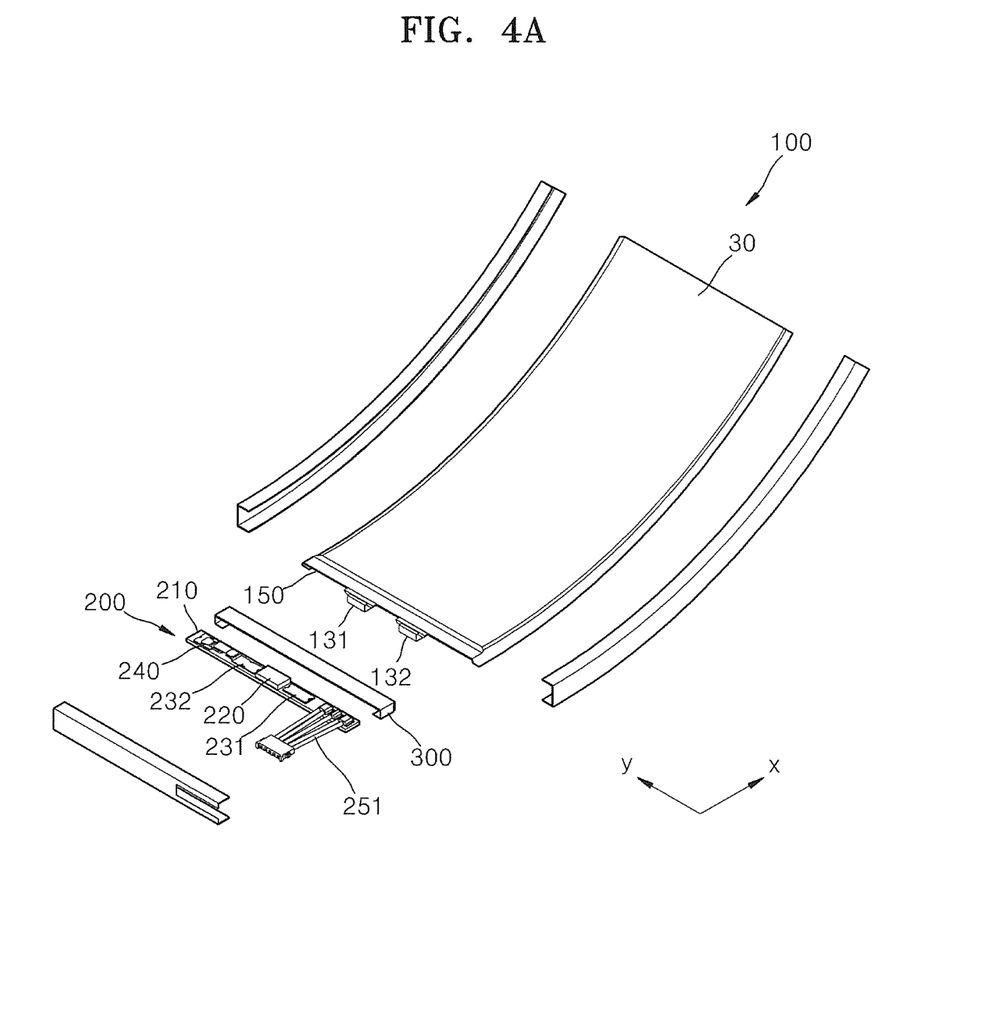
FIG. 4A is a schematic exploded view of a battery pack according to an embodiment of the present invention.
Figure 4B:
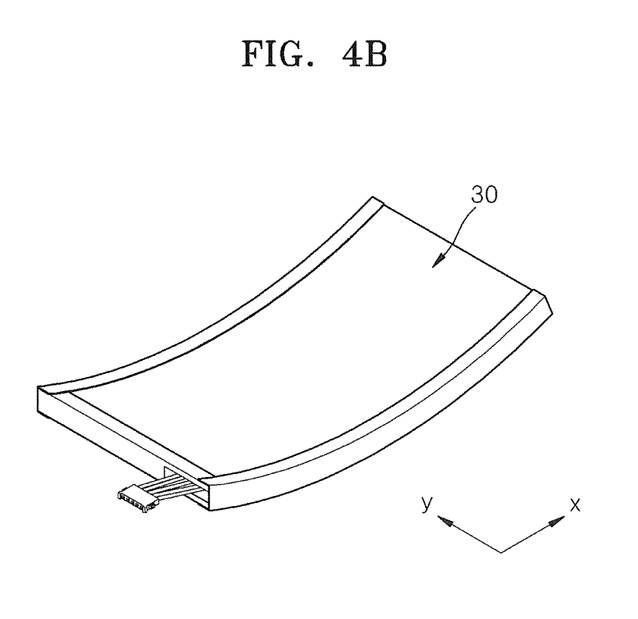
FIG. 4B is a schematic exploded perspective view of the battery pack illustrated in FIG. 4A.

FIG. 4A is a schematic perspective view of a battery pack 100 according to an embodiment of the present invention. FIG. 4B is a schematic exploded perspective view of the battery pack 100 illustrated in FIG. 4A.

Referring to FIGS. 4A and 4B, the battery pack 100 includes a battery cell 30 including an electrode assembly curved to the center of an axis prepared by stacking and winding a first electrode, a second electrode, and a separator interposed between the first and second electrodes and having at least one surface including a coated layer of a thermoplastic polymer, a pair of electrode tabs protruding from one side of the electrode assembly, and a case accommodating and sealing the electrode assembly and an electrolyte, and curved to the center of the same axis as the axis of the electrode assembly; a PCM 200; and insulating tape 300.

An upper portion of the battery cell 30 includes a terrace part 150, and the battery cell 30 has a curved-shape curved to the center of an x-axis direction, i.e., a curved-shape curved to the center of an axis that is substantially parallel to a length direction of the electrode assembly included in the battery cell 30.

The PCM 200 is mounted on the terrace part 150 and is electrically connected to the battery cell 30 so as to prevent overheating or an explosion due to overcharge, overdischarge, or overcurrent of the battery cell 30.

The PCM 200 may include a circuit board 210, a circuit device 220 mounted on the circuit board 210, a first electrode lead tab 231, a second electrode lead tab 232, a safety device 240, and a plurality of cables 251. All of the circuit device 220, the first and second electrode lead tabs 231 and 232, the safety device 240, and the cables 251 may be disposed on one side of the circuit board 210.

The first and second electrode lead tabs 231 and 232 to be electrically connected to the battery cell 30 are disposed on one side of the circuit board 210. The first electrode lead tab 231 is welded and electrically connected to the first electrode tab 131 of the battery cell 30, and the second electrode lead tab 232 is welded and electrically connected to the second electrode tab 132 of the battery cell 30.

The circuit board 210 includes a charge/discharge circuit pattern for achieving a uniform charge state by controlling charge/discharge of the battery cell 30, or a protection circuit pattern for preventing overdischarge and overcharge. The circuit device 220 may be disposed on one side of the circuit board 210 so as to realize the charge/discharge circuit pattern and the protection circuit pattern.

The safety device 240 prevents a defect due to heating of the battery cell 30 by blocking a current if the battery cell 30 is heated at a threshold or allowed temperature or higher. The safety device 240 may be a positive thermal coefficient (PTC) device.

The cables 251 are connected to a first electrode terminal and a second electrode terminal, and may be electrically connected to an external electronic device (e.g., a laptop computer, a tablet PC, or a charger). One of the cables 251 may be connected to ground. A connector allows the cables 251 to be easily connected to the external electronic device.

The insulating tape 300 may be interposed between the terrace part 150 and the PCM 200. For example, the insulating tape 300 may surround one side of the PCM 200, on which the circuit device 220, the first and second electrode lead tabs 231 and 232, the safety device 240, and the cables 251 are disposed, so as to electrically insulate the PCM 200 from the terrace part 150 and to protect the PCM 200 from an external environment. The insulating tape 300 may be disposed on an upper portion of the PCM 200 and on a side of the battery cell 30.

A battery pack according to another embodiment of the present invention may include a PCM and insulating tape on a side of a battery cell.

According to one or more embodiments of the present invention, a method of preparing a battery cell includes preparing a separator including coated layers of a thermoplastic polymer on both sides; preparing an electrode assembly including a first electrode, a second electrode, and the separator interposed between the first and second electrodes; preparing a flat battery cell by accommodating the electrode assembly in a case, sealing the case except for an electrolyte inlet, and sealing the electrolyte inlet after injecting an electrolyte; and curving the flat battery cell to the center of an axis that is substantially parallel to an edge of the electrode assembly in a length direction.

The thermoplastic polymer may include polyvinylidenefluoride or polyvinylidenefluoride-co-hexafluoropropylene.

Figure 5:
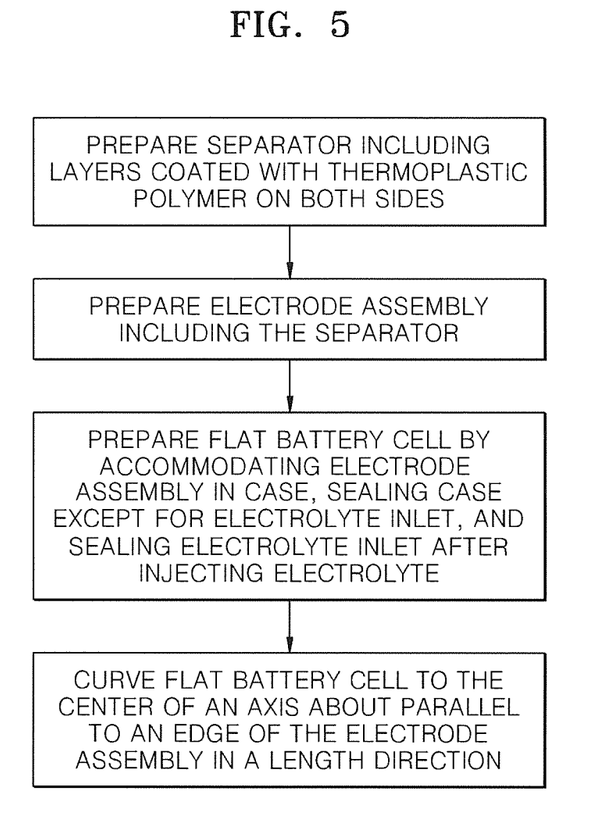
FIG. 5 is a flowchart of a method of preparing a battery cell, according to an embodiment of the present invention.

FIG. 5 is a flowchart of a method of preparing a battery cell, according to an embodiment of the present invention.

A separator being coated with layers of polyvinylidenefluoride or polyvinylidenefluoride-co-hexafluoropropylene on both sides thereof is prepared.

The separator may have a thickness of about 5 μm to about 30 μm, for example, about 7 μm to about 27 μm, or, for example, about 16 μm to about 27 μm.

The coated layers may be formed by using a dip coating, a spray coating, a die coating, a roll coating, a comma coating, or a combination thereof. However, the coating methods are not limited thereto and all coating methods suitable can be used.

The coated layers may have a thickness of about 0.5 μm to about 6 μm, for example, about 3 μm to about 6 μm.

In one embodiment, the separator with the coated layers of polyvinylidenefluoride or polyvinylidenefluoride-co-hexafluoropropylene within the above thickness ranges has improved adhesion between the separator and a first electrode plate, and between the separator and a second electrode plate, and allows an electrolyte to easily permeate through the separator.

Then, an electrode assembly including a first electrode, a second electrode, and the separator interposed between the first and second electrodes is prepared. The electrode assembly is prepared by stacking the first electrode including the first electrode plate and a first electrode active material layer, the second electrode including the second electrode plate and a second electrode active material layer, and the separator interposed between the first and second electrodes, and then winding them to a form of jelly-roll.

A flat battery cell is prepared by accommodating the electrode assembly in a case, sealing the case except for an electrolyte inlet, and sealing the electrolyte inlet after injecting an electrolyte.

The term "the case except for an electrolyte inlet" herein refers to the edge portions of an upper case and a lower case. The sealing method may be, for example, heat fusion method under a reduced pressure.

Thereafter, the flat battery cell is curved to the center of an axis that is substantially parallel to an edge of the electrode assembly in a length direction. At this step, since not only the electrode assembly but also the battery cell are pressed and curved, the process efficiency of this step is excellent.

The curving of the flat battery cell includes mounting and pressing the flat battery cell on a pair of jigs, and separating the jigs of the pair of jigs and removing the battery cell on one of the jigs of the pair of jigs.

The pressing may be performed at a pressure of about 150 kgf to about 1000 kgf and a temperature of about 95° C. to about 110° C. By performing heat fusion within the above pressure and temperature ranges, an adhesion occurs between polymer layers coated on both sides of the separator and a binder polymer of an electrode plate coating layer and thus the flat battery cell may be curved without delamination of the separator from the electrode plates.

Figure 6:
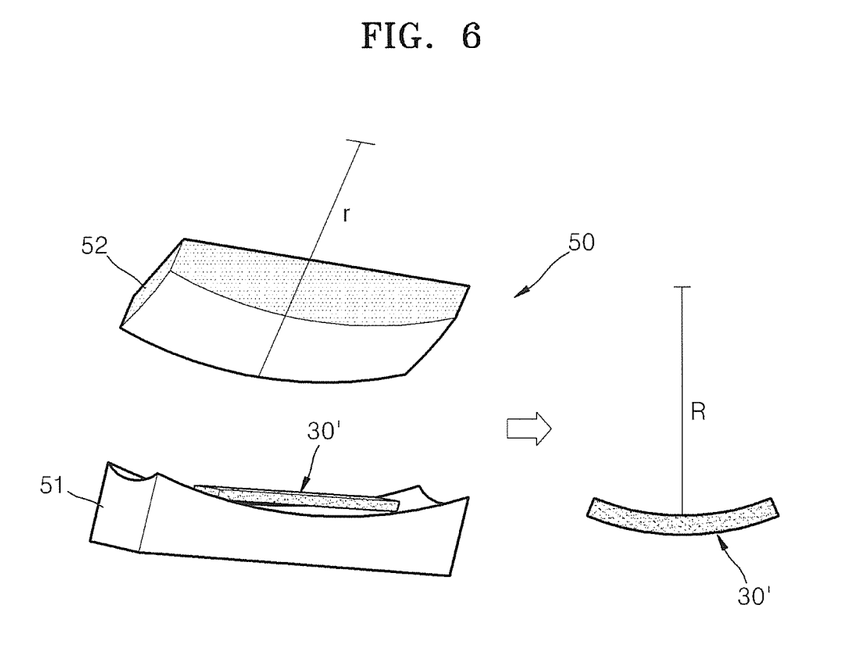
FIG. 6 is a schematic diagram showing a method of preparing a battery cell having a radius of curvature R, according to an embodiment of the present invention.

FIG. 6 is a schematic diagram showing a method of preparing a battery cell having a radius of curvature R, according to an embodiment of the present invention.

A pair of jigs 50 includes a concave jig 51 having the radius of curvature r and a convex jig 52 corresponding to the concave jig 51. The pair of jigs 50 may have a heater therein.

The radius of curvature r of the jigs 51, 52 of the pair of jigs 50 may be about 150 mm to about 600 mm, for example, about 250 mm to about 600 mm. The pair of jigs 50 having the radius of curvature r may be used to achieve a radius of curvature R that is appropriate to prepare a high-capacity battery cell.

The battery cell having the radius of curvature R may be prepared by mounting and pressing a flat battery cell 30' on the pair of jigs 50 having the radius of curvature r, and then separating the jigs of the pair of jigs 50 and removing the battery cell 30' curved to the center of the same axis as the axis of an electrode assembly, i.e., an axis parallel to an edge of the electrode assembly in a length direction, from the jig 50. The battery cell curved to the center of the same axis as the axis of the electrode assembly may allow a liquid electrolyte injected into the battery cell to easily permeate into electrode plates, may minimize or reduce stress due to an interfacial friction with the electrode plates so as to reduce a restoring force to the flat shape, and thus may have the radius of curvature R close to the radius of curvature r of the jigs of the pair of the jigs 50.

An error range between an average radius of curvature-R of the battery cell and the radius of curvature r of the jigs of the pair of jigs 50 may be equal to or less than about 20 mm. For example, the error range between the average radius of curvature R of the battery cell and the radius of curvature r of the jigs of the pair of jigs 50 may be equal to or less than about 10 mm. In the present specification, the term "average radius of curvature R" refers to an average of radius of curvature R measured at least twice by using a 3D optical surface profiler (produced by ZYGO Corporation).

Embodiments of the present invention and comparative examples will now be described. However, the following examples are merely embodiments of the present invention and the present invention is not limited thereto.

EXAMPLES

Preparation Example 1

Preparation Example 1-1: Preparation of a First Electrode 97.2 weight parts of $LiCoO_2$ powder as a first electrode active material, 1.5 weight parts of polyvinylidenefluoride as a binder, and 1.3 weight parts of carbon black as a conductive material were dispersed in an N-methyl pyrrolidone solvent to prepare a first electrode slurry. The first electrode slurry was coated on an aluminum electrode base material to a thickness of about 145 μm by using a doctor blade (gap: 170 mm), was heat-treated in a vacuum at 100° C. for 5.5 hours, and then dried and roll-pressed to prepare a first electrode plate including a first electrode active material layer. The first electrode plate was cut to prepare a first electrode in a strip shape having a width of 457 mm and a height of 65.5 mm.

Preparation Example 1-2: Preparation of a Second Electrode 98 weight parts of graphite as a second electrode active material, 1 weight part of styrene-butadiene rubber as a binder, and 1 weight part of carboxymethylcellulose as a thickener were dispersed in an N-methyl pyrrolidone solvent to prepare a second electrode slurry. The second electrode slurry was coated on a copper electrode base material to a thickness of about 140 μm by using a doctor blade (gap: 160 mm), heat-treated in a vacuum at 145° C. for 6.5 hours, and then dried and roll-pressed to prepare a second electrode plate including a second electrode active material layer. The second electrode plate was cut to prepare a second electrode in a strip shape having a width of 448 mm and a height of 66.5 mm.

Preparation Example 1-3: Preparation of a Separator 5 weight parts of a polyvinylidenefluoride binder (produced by Solvay) was mixed with 95 weight parts of an N-methylpyrrolidone solvent to prepare a slurry. The slurry was coated on both sides of a polyethylene separator base material (produced by Asahi), the separator having a thickness of 9 μm by using a dip coating method so as to prepare a separator including a coated layer of polyvinylidenefluoride and having a thickness of 3 μm.

Comparative Preparation Example 1

Comparative Preparation Example 1-1: Preparation of a First Electrode

The method of Preparation Example 1-1 was used to prepare a first electrode in a strip shape having a width of 457 mm and a height of 65.5 mm.

Comparative Preparation Example 1-2: Preparation of a Second Electrode

The method of Preparation Example 1-2 was used to prepare a second electrode in a strip shape having a width of 448 mm and a height of 66.5 mm.

Comparative Preparation Example 1-3: Preparation of a Separator

A polyethylene separator (produced by Asahi) having a thickness of 14 μm was prepared.

Example 1: Preparation of a Battery Cell

The first electrode prepared in Preparation Example 1-1, the second electrode prepared in Preparation Example 1-2, and the separator prepared in Preparation Example 1-3 interposed between the first and second electrodes were stacked and then wound in a length direction to a form of jelly-roll so as to prepare an electrode assembly. The electrode assembly was accommodated in a case, and the edges of an upper case and a lower case of the case were sealed by using heat fusion under a vacuum, then an electrolyte inlet was sealed after injecting an electrolyte in which 1.13 M LiPF$_6$ is dissolved in ethylene carbonate (EC)+dimethyl carbonate (DMC)+diethyl carbonate (DEC) (volume ratio: 3:5:2), so as to prepare a flat battery cell.

The flat battery cell was mounted between a concave jig and a convex jig of a pair of jigs including a heater therein and having a radius of curvature of 400 mm, pressed at a pressure of 180 kgf and a temperature of 100° C., separated from the jigs, and then was left for 2 min., so as to prepare a battery cell curved to the center of an axis that is substantially parallel to an edge of the electrode assembly in a length direction.

Comparative Example 1: Preparation of a Battery Cell

The first electrode prepared in Comparative Preparation Example 1-1, the second electrode prepared in Comparative Preparation Example 1-2, and the separator prepared in Comparative Preparation Example 1-3 interposed between the first and second electrodes were stacked and then wound in a length direction to a form of jelly-roll so as to prepare an electrode assembly. The electrode assembly was accommodated in a case, and the edges of an upper case and a lower case of the case were sealed by using heat fusion under a vacuum, then an electrolyte inlet was sealed after injecting a polymer electrolyte solution including an acrylate-based monomer according to Formula 1 and hexyl acrylate at a weight ratio of 3:1, and 400 ppm of a lauryl peroxide (LPO) initiator based on the polymer electrolyte solution in order to form a polymer electrolyte solution in which 1.13 M LiPF$_6$ is dissolved in ethylene carbonate (EC)+dimethyl carbonate (DMC)+diethyl carbonate (DEC) (volume ratio: 3:5:2), so as to prepare a flat battery cell.

The flat battery cell was left at room temperature for 1 day, degassed in a vacuum, sealed, and mounted between a concave jig and a convex jig of a pair of jigs including a heater therein and having a radius of curvature of 300 mm. The flat battery cell was pressed at a pressure of 180 kgf. The battery cell was then separated from the jig, and left at 75° C. for 3 hours to cause polymerization of the monomers in the electrolyte, so as to prepare a battery cell curved to the center of an axis that is substantially parallel to an edge of the electrode assembly in a length direction.

<Formula 1>

(Here, EG is ethylene glycol, DEG is diethylene glycol, TMP is triemethylol propane, each of l, m, and n is 0 or an integer equal to or greater than 1, and a weight-average molecular weight is about 25000, and the molecular weight is less than about 30000.)

Evaluation Example 1: Restoring Force Evaluation

Radius of curvature R of the battery cell of Example 1 and radius of curvature R of the battery cell of Comparative Example 1 were individually measured 20 times by using a 3D optical surface profiler (produced by ZYGO Corporation), and an average radius of curvature R of the battery cell of Example 1 and an average radius of curvature R of the battery cell of Comparative Example 1 were calculated by using a minitab program.

Figure 7A:
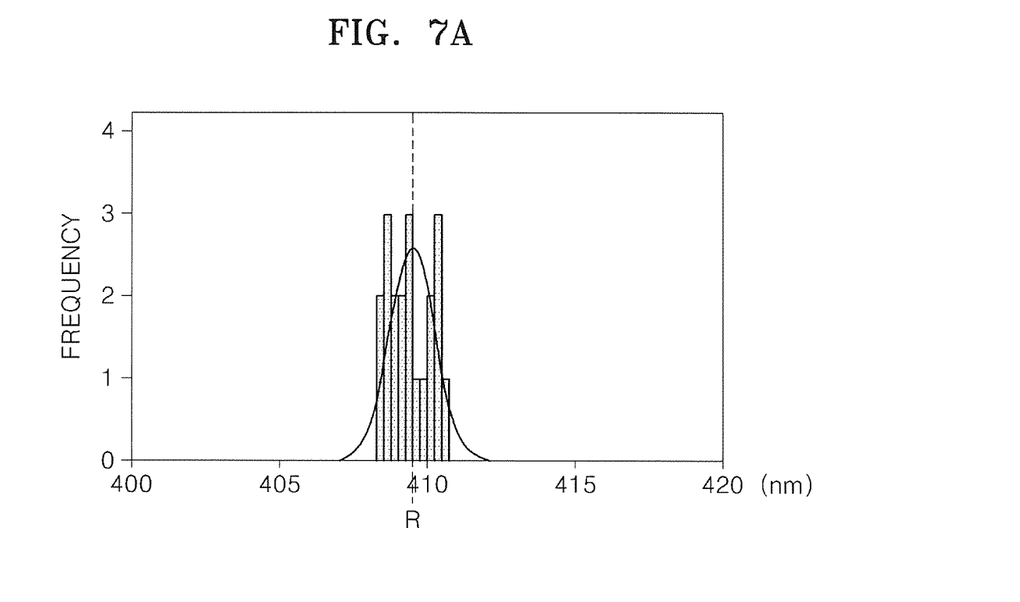
FIG. 7A is a distribution chart showing the frequency of a radius of curvature and an average radius of curvature of a battery cell of several measurements of Example 1.
Figure 7B:
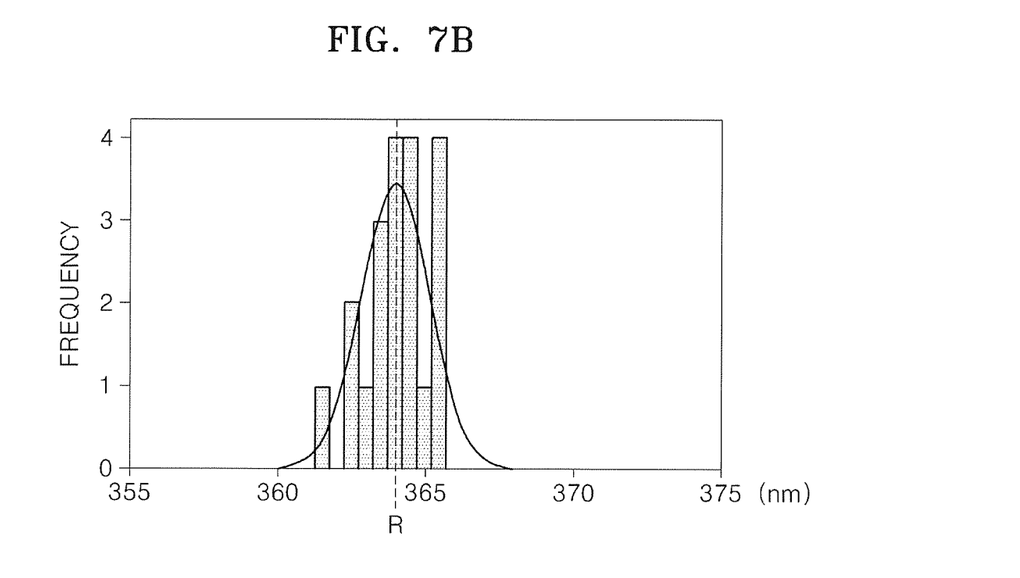
FIG. 7B is a distribution chart showing the frequency of a radius of curvature and an average radius of curvature of a battery cell of several measurements of Comparative Example 1.

Results thereof are shown in FIGS. 7A and 7B. Also, the average radius of curvature R of the battery cell of Example 1 and the average radius of curvature R of the battery cell of Comparative Example 1 are shown in Table 1 in comparison to the radius of curvature r of the jigs of the pair of jigs.

TABLE 1

| | Average Radius of Curvature R of Battery Cell (mm) | Radius of Curvature r of Jig (mm) |
|---|---|---|
| Example 1 | 409.5 | 400 |
| Comparative Example 1 | 364 | 300 |

Referring to Table 1, an error range between the average radius of curvature R of the battery cell of Example 1 and the radius of curvature r of the jig is 9.5 mm while an error range between the average radius of curvature R of the battery cell of Comparative Example 1 and the radius of curvature r of the jig is 64 mm.

The error range between the average radius of curvature R of the battery cell of Example 1 and the radius of curvature r of the jig is less than the error range between the average radius of curvature R of the battery cell of Comparative Example 1 and the radius of curvature r of the jig, and is equal to or less than 10 mm.

The above result shows that a restoring force of the battery cell of Example 1 to a flat shape is reduced.

Although a pouch-shaped case is described above, the present invention is not limited thereto. For example, the present invention may also be applied to a can-shaped battery pack.

As described above, according to one or more of the above embodiments of the present invention, an electrode assembly is curved to the center of an axis that is substantially parallel to a length direction of the electrode assembly so as to improve the efficiency of usage of an inner space, and includes a coated layer of a thermoplastic polymer on at least one side of a separator so as to improve an adhesion between the separator and an electrode plate. Also, the battery cell includes a liquid electrolyte that easily permeates into the electrode plate having a high density.

While the present invention has been particularly shown and described with reference to embodiments thereof, it will be understood by those of ordinary skill in the art that various changes in form and details may be made therein without departing from the spirit and scope of the present invention as defined by the following claims and equivalents thereof.

What is claimed is:

1. A battery cell comprising:
an electrode assembly comprising a first side surface and a second side surface opposite to the first side surface, and a third side surface and a fourth side surface opposite to the third side surface, the third and the fourth side surfaces each crossing the first and the second side surfaces, the electrode assembly prepared by stacking and winding a first electrode comprising a first binder, a second electrode comprising a second binder, and a separator between the first and second electrodes, wherein the separator has at least one side directly coated with a layer to a thickness of about 0.5 µm to about 6 µm, the layer comprising a thermoplastic polymer as a major component;
a pair of electrode tabs protruding from the first side surface of the electrode assembly; and
a case accommodating the electrode assembly and an electrolyte, the case and the electrode assembly curved to the center of an axis of the electrode assembly that is substantially parallel to an edge of the electrode assembly in a length direction,
wherein each of the first side surface and the second side surface of the electrode assembly exposes a plurality of layers of the first electrode and a plurality of layers of the second electrode, and each of the third side surface and the fourth side surface is parallel to the length direction,
wherein in the curved electrode assembly, the first and second side surfaces of the electrode assembly are curved toward each other,
the thermoplastic polymer is a same material as the first binder and/or the second binder,
wherein the electrode assembly has a length direction, a width direction crossing the length direction and a thickness direction crossing the length direction and the width direction, and
in a cross-section of the electrode assembly cutting along the length direction and the thickness direction, a radius of curvature at each end side of the electrode assembly is the same as a radius of curvature at a center of the electrode assembly, and
wherein the electrode assembly has a spherical radius of curvature of 250 mm to 600 mm.

2. The battery cell of claim 1, wherein the thermoplastic polymer is a fluorine-based thermoplastic polymer.

3. The battery cell of claim 1, wherein the thermoplastic polymer comprises polyvinylidenefluoride or polyvinylidenefluoride-co-hexafluoropropylene.

4. The battery cell of claim 1, wherein the electrolyte comprises lithium salt and a non-aqueous organic solvent.

5. The battery cell of claim 4, wherein the lithium salt comprises at least one selected from the group consisting of $LiPF_6$, $LiBF_4$, $LiClO_4$, $Li(CF_3SO_2)_2N$, $LiCF_3SO_3$, $LiSbF_6$, and $LiAsF_6$.

6. The battery cell of claim 4, wherein the non-aqueous organic solvent comprises a carbonate-based solvent, an ester-based solvent, an ether-based solvent, a ketone-based solvent, an alcohol-based solvent, or a non-protic solvent.

7. The battery cell of claim 1, wherein the electrode assembly is curved to the center of the axis that is substantially parallel to the edge of the electrode assembly in the length direction.

8. The battery cell of claim 7, wherein the electrode assembly is symmetrical with respect to an axis that passes through the center of the axis of the electrode assembly and normal to the axis of the electrode assembly.

9. The battery cell of claim 1, wherein the case is a soft pouch.

* * * * *